Patented May 19, 1942

2,283,326

UNITED STATES PATENT OFFICE 2,283,326

YELLOW AZO DYESTUFFS

Friedrich Felix and Willy Müller, Basel, Switzerland, assignors to the firm of Society of Chemical Industry in Basle, Basel, Switzerland No Drawing. Application October 7, 1940, Serial No. 360,180. In Switzerland October 26, 1939

10 Claims. (Cl. 260—163)

It has been found that dyestuffs of the general formula

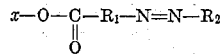

$$x-O-\underset{\underset{O}{\|}}{C}-R_1-N=N-R_2$$

in which $x$ represents a divalent atomic grouping consisting of at least 2 carbon atoms and combined with a lyophilic group, the lyophilic character of which is caused by the presence of a hydroxyl group, and in which $R_1$ stands for a mononuclear aromatic six membered ring and $R_2$ for the radical of a yellow component, i. e., a coupling component which belongs to the class of mononuclear phenols capable of coupling or to the enolizable ketones—it is known that these two classes of substances are primarily those which yield fast yellow dyestuffs with diazo compounds—and in which the mononuclear aromatic six membered ring may be further substituted, form valuable greenish-yellow to reddish-yellow dyestuffs which, on the one hand by reason of their favorable behaviour in the dyebath and on the other by reason of the fastness of the dyeings they yield, are especially valuable for the dyeing of acetate rayon.

Among the dyestuffs of the general formula explained above, those are particularly valuable in which $x$ stands for an alkyl radical consisting of at least 2 and at most 4 carbon atoms, which is united to a lyophilic group which itself corresponds to the general formula $-O-z-$, in which $z$ represents hydrogen or the radical of a polybasic, preferably dibasic acid, the molecular weight of which is not less than 90, and which may be either organic or inorganic in nature. These dyestuffs thus correspond to the general formula

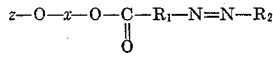

$$z-O-x-O-\underset{\underset{O}{\|}}{C}-R_1-N=N-R_2$$

in which $R_1$, $R_2$, $x$ and $z$ have the signification already given. In such compounds, the hydroxyl group possessing the lyophilic character may be not only the hydroxyl group of an alcohol grouping but also the hydroxyl group of a carboxylic or sulfonic acid group.

Again, among the dyestuffs of this group, those are particularly valuable on account of the solubility of their alkali salts in which $z$ represents the radical of a dibasic acid, the molecular weight of which is at least 90, and which may be either organic or inorganic in nature.

Thus, the new dyestuffs are derived from alkyl esters of amino carboxylic acids of the benzene series which are substituted in the alkyl radical, this substituent in the alkyl radical being lyophilic. The amino carboxylic acids of the benzene series which form the basis of these esters may belong to the type of p-aminobenzoic acid; they may also be derived from meta-amino- or ortho-aminobenzoic acid and, in addition to the amino and carboxyl groups, may carry other substituents.

The particularly valuable dyestuffs of the present application thus are acid esters of carboxylic acid esters. These dyestuffs are derived, on the one hand, from aminobenzene carboxylic acid hydroxyalkyl esters, such as aminobenzene-4-carboxylic acid β-hydroxyethyl ester, 1-amino-4-chlorobenzene-5-carboxylic acid β-hydroxypropyl ester, 1-amino-2-nitrobenzene-4-carboxylic acid β-hydroxyethyl ester, 1-amino-3-methylbenzene-4-carboxylic acid β-hydroxylethyl ester, 1-amino-3-methoxy-4-carboxylic acid β-hydroxypropyl ester, 1-amino-3-methylbenzene-5-carboxylic acid β-hydroxybutyl ester, 1-amino-3-methylbenzene-5-carboxylic acid γ-hydroxybutyl ester and, on the other hand, from polybasic acids whose molecular weights are no less than 90, such as sulfuric acid, thiosulfuric acid, phosphoric acid, oxalic acid, malonic acid, succinic acid, maleic acid, glutaric acid, adipic acid, pimelic acid, phthalic acid, sulphophthalic acid, and the like.

Finally, with regard to the yellow components, the following may be mentioned:

Phenol, also phenols which are substituted in the para-position to the hydroxyl group, such as para-cresol, as well as resorcinol or resorcinol monoalkyl ethers. There also come into question dihydroxyquinolines, esters and amides of acetoacetic acid and, particularly, pyrazolones, among which the following should be mentioned by name: 1-phenyl-3-methyl-5-pyrazolone and its derivatives which are substituted in the phenyl nucleus, such as 1-tolyl-3-methyl-5-pyrazolones, 1-chlorophenyl-3-methyl-5-pyrazolones and particularly 1-ortho-chlorophenyl-3-methyl-5-pyrazolone, the dichlorophenyl-3-methyl-5-pyrazolones as well as also pyrazolone carboxylic and sulfonic acids and, finally, simple pyrazolones, such as 3-methyl-5-pyrazolone.

The dyestuffs which form the subject of the present application are thus completely new products. The manner in which they are prepared is to be seen from their constitution. Thus, these dyestuffs may be obtained by uniting the diazo compounds of aromatic amines of the general formula

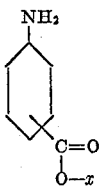

in which $x$ has the meaning already given, and which may contain further nuclear substituents if desired, with phenols capable of coupling, or with enolizable ketones.

Another way in which these dyestuffs may be prepared consists in causing nitro compounds of the general formula

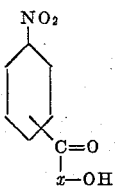

in which $x$ has the meaning already signified, and which may contain further nuclear substituents if desired, to react successively with reducing agents, nitrous acid, phenols capable of coupling or enolizable ketones, and, if desired, polybasic inorganic or organic acids or their reactive derivatives in such a manner that the treatment with reducing agents takes place before that with nitrous acid and the combination with the phenols capable of being coupled or with the enolizable ketones occurs directly after the treatment with nitrous acid, so that azo dyestuffs are formed which contain an aliphatically united hydroxyl group which, if desired, is esterified with a radical capable of forming salts.

A further group of these dyestuffs may be obtained by causing nitro compounds of the general formula

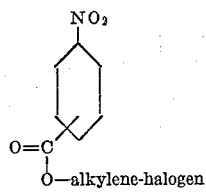

to react successively with reducing agents, nitrous acid, phenols capable of coupling or enolizable ketones, and salts of sulfurous acid or thiosulfuric acid in such a manner that the treatment with reducing agents precedes that with nitrous acid and the combination with the phenols capable of coupling or with the enolizable ketones occurs directly after the treatment with nitrous acid, so that dyestuffs are obtained which contain an aliphatically united sulfonic acid group, possibly in the form of a thiosulfonic acid.

In the products of the general formula given above, the halogen may be replaced by the cyanogen radical, and the cyanogen group may then be saponified to a carboxyl group at a suitable stage of the dyestuff's preparation.

The nitro compounds of the formulas above described, as well as the corresponding amino compounds, are products which may be prepared by methods of themselves known or by analogous processes.

The nitro and amino compounds of the general formulas

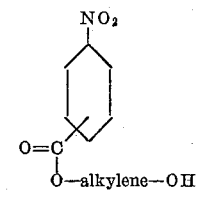

or

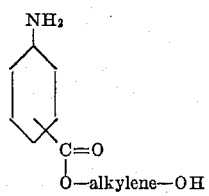

which contain an ester group, may be prepared by treating salts of the same nitrobenzene carboxylic acids with alkylene halogenhydrins (for example, with ethylene-chlorhydrin or with epichlorhydrin) in such a manner that esters are formed which contain one or possibly two hydroxyl groups. The nitro group is then reduced, the aminobenzene-carboxylic acid esters already mentioned being formed.

These aminobenzene-carboxylic acid esters are now diazotized by treatment with nitrous acid and are converted into the dyestuffs by combining them with the coupling components described at the outset.

These dyestuffs contain an aliphatically combined hydroxyl group. As such, when in the highly dispersed state, they dye esters and ethers of cellulose in yellow tones. On account of the presence of the hydroxyl group, these dyestuffs may be esterified with the already mentioned inorganic or organic polybasic acids, water-soluble dyestuffs being formed which also possess the property of dyeing the materials named in fast, yellow shades. The polybasic acids may be advantageously used in the form of their anhydrides or halides, or also in the form of their esters with low molecular alcohols.

Particular reference must still be made to the fact that the esterification of the alkylene-OH-group of the diazotizing components combined acidyl-like with the $$-C=O-\text{group}$$

may take place during their preparation; by diazotization and combination with the coupling components which here come in question water-soluble dyestuffs will be directly obtained.

Compounds which correspond to the general formula

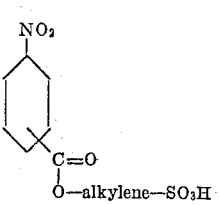

or

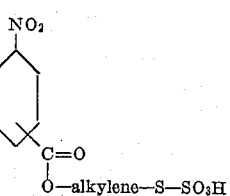

and the amino compounds obtainable therefrom by reduction—which form intermediate products of the dyestuffs already mentioned which contain an aliphatically combined sulfonic acid group, possibly in the form of a thiosulfonic acid group—may be prepared by treating the corresponding nitrobenzene carboxylic acids with alcohols which contain at least 1 exchangeable, aliphatically combined halogen atom in such a manner that the halogen-alkyl esters of these nitrobenzene carboxylic acids are formed, the halogen atom being exchanged for the sulfonic acid group by treatment with alkali sulfites or for the thiosulfuric acid group by treatment with alkali thiosulfates, and the nitro group being converted into the amino group by treatment with reducing agents. The reduction may also be carried out before the exchange of the halogen atom takes place. Amino compounds of this nature are, for example, 1-aminobenzene-4-carboxylic acid ethyl ester β-sulfonic acid or β-thiosulfonic acid, 1-aminobenzene-3-carboxylic acid ethyl ester β-sulfonic acid or β-thiosulfonic acid, 1-amino-2-nitrobenzene-4-carboxylic acid ethyl ester β-sulfonic acid or β-thiosulfonic acid and the like. In these cases, also, the exchange of the halogen atom for the sulfonic acid or thiosulfonic acid may be carried out only with the finished dyestuff. These dyestuffs, particuof the resulting ester with iron and acetic acid, are diazotized by known methods. This diazo solution is added to a solution of 208 parts of 1-(2-chloro)-phenyl-3-methyl-5-pyrazolone, which has been dissolved in the calculated quantity of aqueous sodium hydroxide and to which an acid-binding agent has been added. When the dyestuff is formed, it is filtered and washed.

The dyestuff thus obtained possesses the probable formula

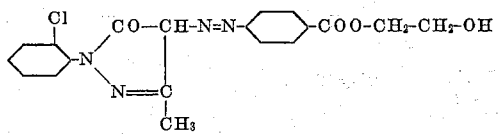

and, in the finely dispersed form, dye acetate rayon in fast yellow shades.

*Example 2*

5 parts of the dyestuff obtained in Example 1 are stirred into about the same quantity of melted maleic acid anhydride. The mass is stirred at about 90–100° C., dissolved in water containing the calculated quantity of an alkali, and the dyestuff is precipitated by sodium chloride.

The dyestuff obtained is a yellow powder when dry, which has the probable formula

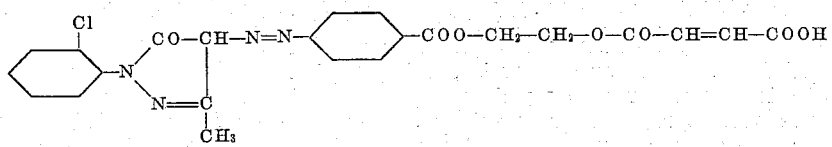

larly in the form of their alkali salts and ammonium salts, dissolve in water and dye ethers and esters of cellulose in yellow shades, which can also be remarkable for their high fastness properties.

Those dyestuffs which contain a salt forming group, among which groups must also be included a sulfonic acid group united to an aromatic nucleus, may also be used for other purposes, for instance, they may be suitable for the dyeing and printing of wool or silk.

The following examples illustrate the invention, the parts being by weight:

*Example 1*

181 parts of 1-aminobenzene-4-carboxylic acid β-hydroxyethyl ester, prepared by treatment of the potassium salt of 1-nitrobenzene-4-carboxylic acid with ethylene chlorhydrin and reduction and which dissolves in water to form a yellow solution. It dyes acetate rayon in the same yellow shade.

In a similar manner, the yellow dyestuff from diazotized 1-amino-3-chlorobenzene-4-carboxylic acid β-hydroxyethyl ester or 1-aminobenzene-4-carboxylic acid β-hydroxy-ethyl ester and 1-phenyl-3-methyl-5-pyrazolone, 1-(2'-methyl)-phenyl-3-methyl-5-pyrazolone, 3-methyl-5-pyrazolone, dioxyquinoline, or cresol or 1-hydroxy-3:4-dimethylbenzene and the reddish-yellow dyestuff from diazotized 1-amino-2-nitrobenzene-4-carboxylic acid β-hydroxyethyl ester and 3-methyl-5-pyrazolone may be esterified with maleic acid, succinic acid or phthalic acid anhydride, whereby solubility in water is attained without appreciable alteration of the dyestuff. Such dyestuffs, in the free state, have the formulas

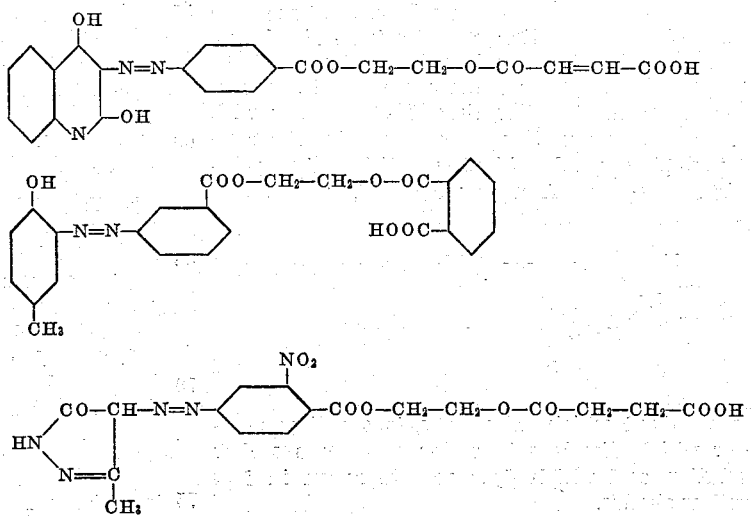

Example 3

By solution of 5 parts of the dyestuff of Example 1 in concentrated sulfuric acid at 50–60° C., a dyestuff is obtained which is soluble in alkali and which possesses properties which are similar to those of the dyestuff of the first paragraph of Example 2.

The new dyestuff, in the free state, possesses the formula

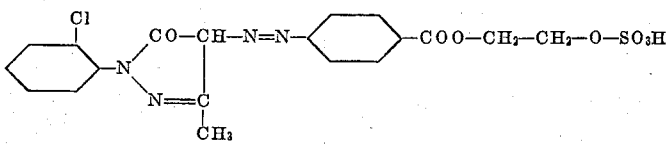

Example 4

40 parts of the dyestuff obtained in Example 1 are heated with 12 parts of anhydrous oxalic acid in 100 parts of toluene for 10 hours at 110° C. After cooling and filtering, the dyestuff is dried in vacuo. The dyestuff is then dissolved in water with addition of the requisite quantity of alkali and is precipitated with sodium chloride, filtered and dried. A yellow powder is obtained which dissolves in water with a yellow coloration and dyes acetate rayon in fast yellow shades. In the free state, the new dyestuff corresponds to the formula

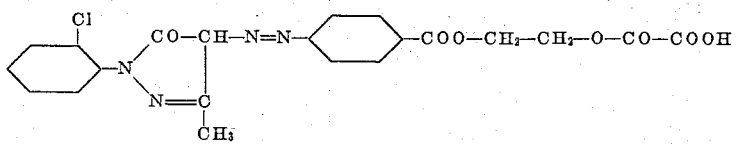

Example 5

267 parts of the sodium salt of 1-aminobenzene-4-carboxylic acid ethyl ester β-sulfonic acid are diazotized with the calculated quantity of sodium nitrite in acid solution. The sodium salt named may be prepared by reaction of 1-nitrobenzene-4-carboxylic acid chloride with ethylene chlorhydrin and cautious reduction of the nitro group of the resulting ester by known methods. By causing the reactive chlorine atom of the 1-aminobenzene-4-carboxylic acid β-chloroethyl ester to react with sodium sulfite, the base used above for diazotization purposes is obtained. Its diazo solution is now added to a solution of 208 parts of 1-ortho-chlorophenyl-3-methyl-5-pyrazolone, prepared by treating this substance with the requisite quantity of caustic soda, the coupling being completed by the addition of an acid-binding agent. A yellow dyestuff, in the free state, of the probable formula

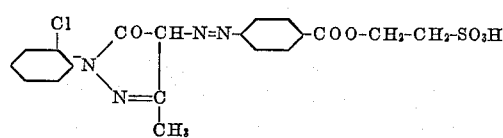

is obtained which, when dry, is a yellow powder which dissolves in water to form a yellow solution and which dyes acetate rayon in fast yellow shades.

Example 6

If 1-aminobenzene-4-carboxylic acid β-chloroethyl ester be caused to react with sodium thiosulfate, 1-aminobenzene-4-carboxylic acid ethyl-ester β-thiosulfonic acid is obtained, the diazo-solution of which may also be caused to react with a solution of 1-ortho-chlorophenyl-3-methyl-5-pyrazolone, a dyestuff which behaves similarly to the above being obtained by working in a similar way.

The new dyestuff, in the free state, corresponds to the formula

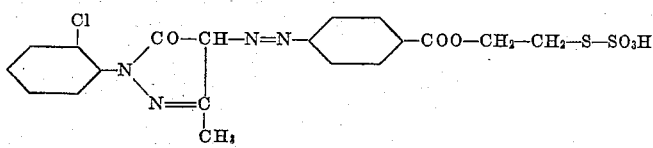

Example 7

10 parts of the dyestuff obtained according to Example 1 are stirred with an addition of a suitable dispersing agent, such as Turkey-red oil or sulfite cellulose waste liquor, to form a homogeneous paste containing 10 percent of dyestuff. 0.5 part of this paste is intimately mixed with 10 parts of water at 50° C. and so many parts of a concentrated soap solution that the dyebath thus obtained corresponds to a soap solution containing 0.2 percent of soap. The dyebath is then diluted with cold water to 300 parts.

10 parts of acetate rayon yarn are entered into the dyebath emulsion thus prepared and are worked while the bath is heated during ¾ hour to 80–85° C., dyeing being continued for a further ¼ hour at this temperature. The yarn is then rinsed and finished as usual. A yellow acetate rayon dyeing is obtained which is remarkable for its excellent fastness to sublimation and water.

Example 8

0.5 part of the dyestuff obtained according to the first paragraph of Example 2 is dissolved in 3000 parts of water. 40 parts of sodium sulfate crystals are then added to the dyebath and 100 parts of acetate rayon yarn are treated therein for 1 hour at 80° C. After rinsing and drying a pure yellow acetate rayon dyeing is obtained.

This dyestuff may also be dyed from a short liquor, for instance, in the jigger, for which process its good solubility and its good exhaustion properties make it very suitable.

What we claim is:

1. The dyestuffs which are the acid esters from divalent acids of molecular weight not less than 90 and azo dyestuffs of the general formula

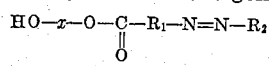

in which $x$ represents an alkyl radical consisting of at least 2 and at most 4 carbon atoms, $R_1$ stands for a mononuclear aromatic six membered ring, and $R_2$ for the radical of a yellow component, which products are dyestuffs dyeing greenish-yellow to reddish-yellow shades.

2. The dyestuffs which are the acid esters from divalent acids of molecular weight not less than 90 and azo dyestuffs of the general formula

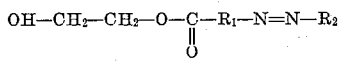

in which $R_1$ represents a mononuclear aromatic six membered ring, and $R_2$ a radical of a yellow component, which products are dyestuffs dyeing greenish-yellow to reddish-yellow shades.

3. The dyestuffs which are the acid esters from divalent acids of molecular weight not less than 90 and azo dyestuffs of the general formula

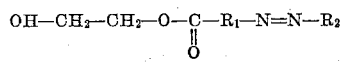

in which $R_1$ represents a mononuclear aromatic six membered ring, and $R_2$ a radical of a yellow component, in which also the

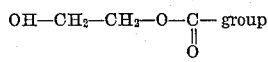

and the

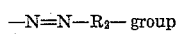

stand in the para-position to each other, which products are dyestuffs dyeing greenish-yellow to reddish-yellow shades.

4. The dyestuffs which are the acid esters from divalent acids of molecular weight not less than 90 and azo dyestuffs of the general formula

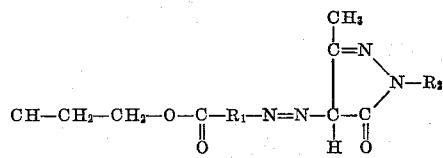

in which $R_1$ and $R_2$ stand for mononuclear aromatic six membered rings, and in which the

and the

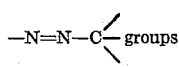

stand in the para-position to each other.

5. The dyestuffs which are the acid esters from dicarboxylic acids having 2 to 4 carbon atoms and azo-dyestuffs of the general formula

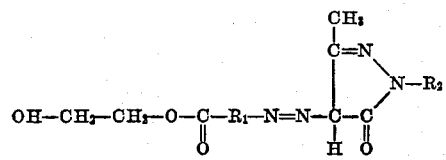

in which $R_1$ and $R_2$ stand for mononuclear aromatic six membered rings, and in which the

and the

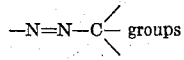

stand in the para-position to each other.

6. The dyestuffs which are the acid esters from divalent acids of molecular weight not less than 90 and azo dyestuffs of the general formula

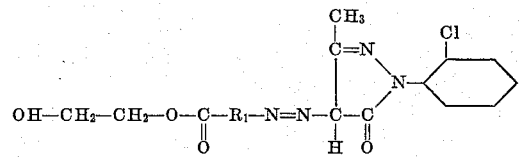

in which R stands for a mononuclear aromatic six membered ring, and in which the

and the

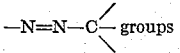

stand in the para-position to each other.

7. The dyestuffs which are the acid esters from dicarboxylic acids having 2 to 4 carbon atoms and azo-dyestuffs of the general formula

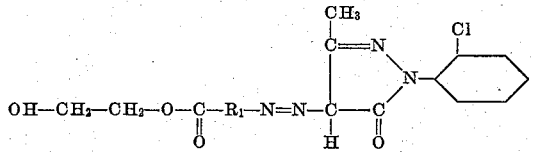

in which $R_1$ stands for a mononuclear aromatic six membered ring, and in which the

and the

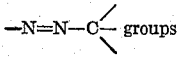

stand in the para-position to each other.

8. The dyestuff of the formula

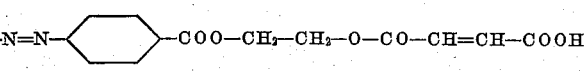

9. The dyestuff of the formula

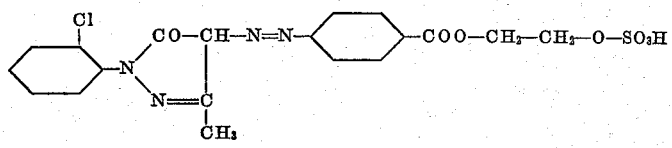

10. The dyestuff of the formula

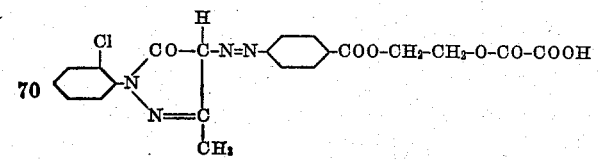

FRIEDRICH FELIX.
WILLY MÜLLER.